E. THOMSON.
ELECTRICAL MEASURING INSTRUMENT.
APPLICATION FILED NOV. 13, 1908.
917,187.
Patented Apr. 6, 1909.
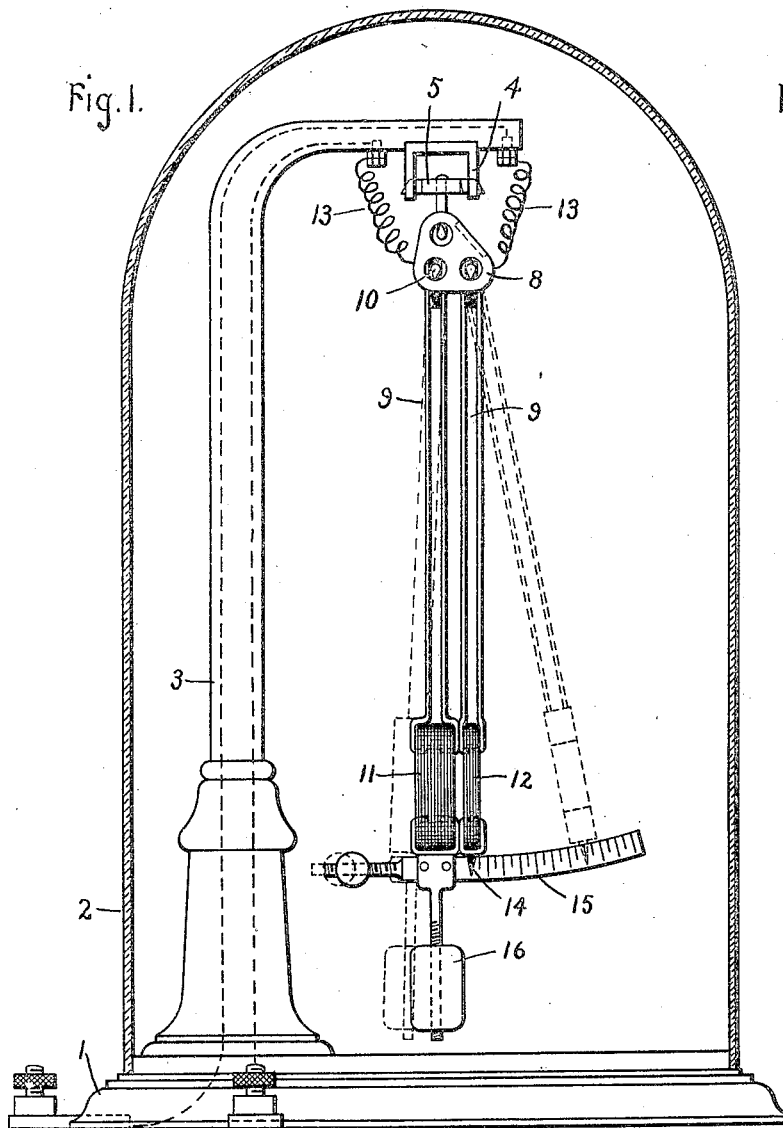
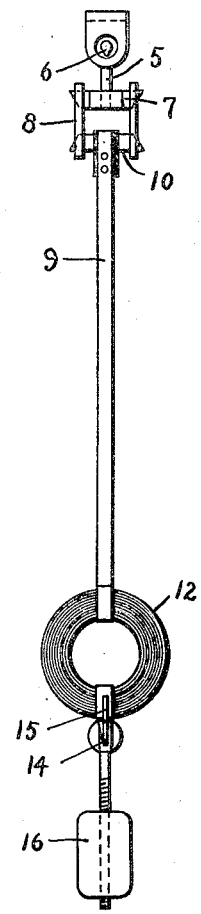
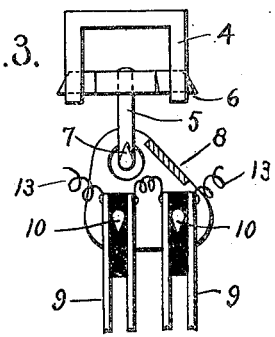
Witnesses:
Earl G. Klock.
J. Ellis Glen.
Inventor:
Elihu Thomson,
by
Atty.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

ELECTRICAL MEASURING INSTRUMENT.

No. 917,187.   Specification of Letters Patent.   Patented April 6, 1909.

Application filed November 13, 1908. Serial No. 462,374.

*To all whom it may concern:*

Be it known that I, ELIHU THOMSON, a citizen of the United States, residing at Swampscott, county of Essex, State of Massachusetts, have invented certain new and useful Improvements in Electrical Measuring Instruments, of which the following is a specification.

My invention relates to electrical measuring instruments and more particularly to instruments which, by indicating the strength of an electrical current with great precision and constancy, are available for testing and calibrating other electrical measuring instruments, the object of the invention being to provide a simple and reliable instrument which remains constant in its calibration, can be used for either direct or alternating current, requires no special setting up or leveling and can be used by comparatively unskilled operators to confirm or to adjust the calibration of other instruments which are more subject to variation.

In carrying out my invention the mutual effect produced between two adjacent parts of a circuit by a current flowing through the circuit is utilized by passing the current to be measured through two coils, suspended like pendulums to swing very freely about their points of suspension and to hang close together when no current is passing. When the two coils are connected in series and current is passed through them, the coils repel each other, and since the effect between the two coils is proportional to the product of the currents flowing through them and therefore to the square of the current when the two coils are in series, the force exerted between the coils varies more rapidly than the current, rendering the instrument very sensitive to variations of current and giving a very accurate and sharply defined indication of the value of the current. Since the action of the instrument depends only upon the mutual effect of the currents in the two coils, the instrument is equally applicable to direct, to alternating and to pulsating currents, and is independent of any chemical action or of changes of temperature. The necessity for careful setting up and leveling of the instrument is avoided by suspending the coils on some form of universal joint which will permit both coils to move freely in any direction as a suspended body. The extent of movement of the coils relative to each other is determined in any suitable way, preferably by providing one coil with a scale which coöperates with the pointer carried by the other coil. By using suitable windings properly connected, the instrument may be made a voltmeter, ammeter or wattmeter.

My invention will best be understood in connection with the accompanying drawing which shows one of the various forms in which the invention may be embodied and in which—

Figure 1 is a longitudinal section through the casing of the instrument showing the parts of the instrument in elevation; Fig. 2 is a view at right angles to Fig. 1, with the casing and standard removed; and Fig. 3 is a detail view of the universal joint used for suspending the coils.

In the specific form of instrument shown in the drawings, any suitable base 1 is provided with a glass cover 2 which fits the base tightly and protects the moving parts of the instrument against dust and currents of air. The parts of the instrument are carried on a vertical standard 3 which is mounted on the base 1 and has a projecting upper end, as shown in the drawing, from which the coils of the instrument are suspended by any suitable universal joint or similar connection which will permit the coils to always hang in a vertical plane, the preferred construction being a universal joint comprising a yoke 4 secured to the standard 3 to carry a cross-shaped connector 5, best shown in Figs. 2 and 3, and which has one set of knife edges 6 in engagement with the yoke 4 and another set of knife edges 7 at right angles to the knife edges 6. A coil support 8, preferably made of two parallel plates, is carried upon the knife edges 7 to swing about said knife edges in a plane at right angles to the plane of oscillation of the connector 5. The support 8 is also provided with bearings for suspension rods 9 which are provided with knife edges 10 to enable the rods to swing freely as pendulums about their points of suspension. The current carrying coils 11 and 12 are secured to the lower ends of the rods 9 and are supplied with current through flexible leads 13 arranged as shown in the drawing to supply current to the coils in all positions of the coils. The coils 11 and 12 in connection with rods 9 form the pendulums which swing freely in the same plane about adjacent points of suspension on the support 8 and the two coils will always hang in a vertical plane regardless of the angle or position of the base 1, since the universal joint between the support 8 and the standard 3 permits the coils 11 and 12 to hang vertically like pendulums regardless of the angle or inclination of the standard 3.

The current carrying coils may be made in various forms but are preferably constructed in the shape of flat coils, as shown in the drawing, and are arranged to hang parallel and close to each other in the position shown in Fig. 1, when no current is flowing. The coils are so wound and connected that when the current which is to be measured flows through them the coils repel each other and tend to take up the position shown in dotted lines in Fig. 1. The current may be led to the coils in any suitable way and, in the particular construction shown in the drawings, each coil is carried on two rods 9, which are made of conductive material and are utilized as conductors for leading the current into and out of each coil, as is apparent from Fig. 2.

The relative movement of the coils due to the mutual repulsion caused by the current flowing through them may be measured in any suitable way, preferably by means of a pointer 14 mounted on one of the coils to coöperate with a scale 15 mounted on the other coil. The coils may be of the same size but are preferably of different sizes and widths, as shown in Fig. 1, the larger coil being provided with an adjusting weight 16 which may be adjusted along the line of suspension of the coil to vary the position of the center of gravity of the pendulum formed by the weight and the coil.

The instrument may be wound as a voltmeter by making the coils of fine wire and connecting them in series, or may be used as an ammeter if the coils are made of heavy wire and are connected in series, preferably so that the whole current flows through them, although obviously a shunt may be used if the current to be measured is very great.

If it is desired to use the instrument as a wattmeter one coil carries the current and the other receives a current varying with the potential of the circuit, this current being secured, as is customary in wattmeters, by connecting the potential coil in series with an outside resistance which in the case of alternating currents should be non-inductive and of fairly large value relative to the resistance of the coil.

An instrument constructed in accordance with my invention, and used with direct current, is comparatively free from disturbance by stray fields and by the magnetic field of the earth when set in any position, and is entirely unaffected by the earth's field when set up so that the plane of the coils is in line with the magnetic meridian, or when used in any position with alternating currents.

My invention may be embodied in many other forms than that shown and described, and I therefore do not wish to restrict myself to the precise form disclosed, but intend to cover in the appended claims all modifications which are within the spirit and scope of my invention.

What I claim as new and desire to secure by Letters Patent of the United States, is,—

1. An electric measuring instrument comprising a support, two coils pivoted to said support at adjacent points above their centers of gravity to swing freely and independently in a common plane, and current supplying means for said coils operative in any position of the coils.

2. An electric measuring instrument comprising a support, two flat coils suspended from adjacent points on said support to swing freely and independently about said points and to normally hang parallel to each other, and means for supplying current to said coils to cause them to repel each other.

3. An electrical measuring instrument comprising a support, two coils suspended from adjacent points on said support to swing freely about said points, means for supplying current to said coils, and indicating means for showing the relative movement of said coils.

4. An electrical measuring instrument comprising a support, two coils suspended from adjacent points on said support to swing freely about said points, means for supplying current to said coils, a scale carried by one of said coils, and a pointer carried by the other coil to coöperate with said scale.

5. An electrical measuring instrument comprising a support, two coils suspended from adjacent points on said support to swing freely about said points, adjusting means for varying the position of the center of gravity of one of said coils, and means for supplying current to said coils to cause them to repel each other.

6. An electrical measuring instrument comprising a support, two coils suspended from adjacent points on said support to swing freely about said points, an adjusting weight on one of said coils mounted for movement along the line of suspension of said coil, and means for supplying current to said coils to cause them to repel each other.

7. An electrical measuring instrument comprising a support, two flat coils suspended from adjacent points on said support to hang parallel with each other and to be brought into contact by the force of gravity, and means for supplying current to said coils to cause mutual repulsion.

8. An electrical measuring instrument comprising a standard, two coils suspended from said standard by a universal suspension arranged to permit said coils to hang vertically and to swing as independent pendulums in the same plane about adjacent points of suspension, and means for supplying current to said coils to cause them to repel each other.

9. An electrical measuring instrument comprising a standard, a support pivotally mounted on said standard to swing in a plane at right angles to its pivot, two coils suspended from said support to swing as independent pendulums in the same plane as said support, and means for supplying current to said coils to cause them to repel each other.

10. An electrical measuring instrument comprising a standard, a support, a universal joint between said standard and said support, two coils suspended from adjacent points on said support to swing freely about said points, and means for supplying current to said coils.

11. An electrical measuring instrument comprising a standard, a support, a connector mounted on said standard on knife edges and carrying said support on other knife edges at right angles to the first, two coils suspended from said support to swing freely as independent pendulums, and means for supplying current to said coils to cause them to repel each other.

In witness whereof, I have hereunto set my hand this eleventh day of November, 1908.

ELIHU THOMSON.

Witnesses:
JOHN A. McMANUS, Jr.,
HENRY O. WESTENDARP.